United States Patent [19]

Ajioka et al.

[11] Patent Number: 5,034,209
[45] Date of Patent: * Jul. 23, 1991

[54] PRODUCTION PROCESS OF CHLORINE

[75] Inventors: Masanobu Ajioka, Yokohama; Shinji Takenaka; Hiroyuki Itoh, both of Omuta; Masafumi Kataita, Houya; Yoshitsugu Kohno, Omuta, all of Japan

[73] Assignee: Mitsui Toatsu Chemicals, Incorporated, Tokyo, Japan

[ * ] Notice: The portion of the term of this patent subsequent to Sep. 11, 2007 has been disclaimed.

[21] Appl. No.: 508,699

[22] Filed: Apr. 13, 1990

Related U.S. Application Data

[63] Continuation of Ser. No. 169,951, Mar. 18, 1988, Pat. No. 4,956,169.

[30] Foreign Application Priority Data

Mar. 18, 1987 [JP] Japan ................... 62-61332

[51] Int. Cl.$^5$ ............................ B01J 8/24; C01B 7/04
[52] U.S. Cl. .................... 423/502; 422/241
[58] Field of Search ............... 423/502, 500, 507; 422/241

[56] References Cited

U.S. PATENT DOCUMENTS

| | | | |
|---|---|---|---|
| 134,190 | 12/1872 | Aubertin | 423/502 |
| 2,268,999 | 1/1942 | Beekhuis | 423/500 |
| 2,382,582 | 8/1943 | Ruthruff | 502/237 |
| 2,395,314 | 2/1946 | Blummer | 423/502 |
| 2,451,870 | 10/1948 | Richardson et al. | 423/507 |
| 2,678,259 | 5/1954 | Banner et al. | 423/502 |
| 2,768,200 | 10/1956 | Busby | 422/241 |
| 3,006,732 | 10/1961 | Baumgartner et al. | 423/502 |
| 3,159,455 | 12/1964 | Skaperdas et al. | 423/502 |
| 3,330,627 | 7/1967 | McCormick et al. | 422/241 |
| 3,667,913 | 6/1972 | Hund | 423/502 |
| 3,785,780 | 1/1974 | Teichmann et al. | 423/212 |
| 3,827,861 | 8/1974 | Zenkner | 423/210 |
| 3,926,702 | 12/1975 | Oki et al. | 422/241 |
| 4,022,582 | 5/1977 | Louthan et al. | 422/241 |
| 4,291,104 | 9/1981 | Keifert | 422/241 |
| 4,552,727 | 11/1985 | Schuchardt et al. | 422/241 |
| 4,803,065 | 2/1989 | Itoh et al. | 423/502 |
| 4,822,589 | 4/1989 | Kiyoura et al. | 423/502 |
| 4,828,815 | 5/1989 | Kiyoura et al. | 423/502 |
| 4,956,169 | 9/1990 | Ajioka et al. | 422/241 |

FOREIGN PATENT DOCUMENTS

| | | | |
|---|---|---|---|
| 184413 | 6/1986 | European Pat. Off. | 423/502 |
| 197302 | 9/1987 | Japan | 423/507 |
| 241805 | 10/1987 | Japan | 423/502 |
| 8308 | 5/1887 | United Kingdom | 423/502 |

OTHER PUBLICATIONS

Chemical Engineers' Handbook, 5th ed., Perry et al, eds. McGraw-Hill Book Co., 1973, p. 23-15.

Primary Examiner—Jeffrey E. Russel
Attorney, Agent, or Firm—Oblon, Spivak, McClelland, Maier & Neustadt

[57] ABSTRACT

Chlorine is produced by reacting hydrogen chloride and oxygen in the presence of a chromium oxide catalyst in a reactor whose catalyst-contacting part is lined with one of lining materials represented by the following general formula(I):

$$M_a X_b \qquad (I)$$

wherein M means boron, aluminum, silicon, titanium, zirconium or chromium, X denotes oxygen, nitrogen or carbon, a is an integer of 1-2 and b stands for an integer of 1-3 or with a mixture of at least two of the lining materials. The above process and reactor are effective in maintaining the activity of the catalyst.

7 Claims, 2 Drawing Sheets

PRODUCTION PROCESS OF CHLORINE

This is a continuation of application Ser. No. 07/169,951, filed on Mar. 18, 1988, now U.S. Pat. No. 4,956,169.

BACKGROUND OF THE INVENTION i) Field of the Invention

This invention relates to a process for producing chlorine by reacting hydrogen chloride and oxygen in the presence of a chromium oxide catalyst and also to a reactor useful in the practice of the process. More specifically, this invention is concerned with the material of a reactor which is employed for the oxidation of hydrogen chloride with oxygen.

ii) Description of the Related Art

Chlorine is produced on a large scale by the electrolysis of brine in order to meet the ever-increasing demand therefor. Caustic soda is also produced along with chlorine in the electrolysis of brine.

Since the demand for caustic soda is lower compared with that for chlorine, the production of chlorine by the electrolysis of brine is confronting a difficult situation that it can hardly cope with this imbalance in demand between these compounds.

On the other hand, a great deal of hydrogen chloride is byproduced upon chlorination or phosgenation of organic compounds. Because such byproduction of hydrogen chloride is far greater than the market demand for hydrochloric acid, a substantial portion of hydrogen chloride is disposed wastefully without its effective utilization. The cost for its disposal has also come up to big figures.

If chlorine can be recovered efficiently from hydrogen chloride which is thrown away in a large volume as described above, the demand for chlorine can be met by using such chlorine along with chlorine produced by the electrolysis of brine in view of the demand for caustic soda.

The reaction in which hydrogen chloride is oxidized to produce chlorine has been known for many years. It has also been well-known to use chromium oxide as a catalyst in such a reaction.

It has recently been found that a chromium oxide catalyst obtained especially by calcining chromium hydroxide has good activity even at relatively low temperatures, whereby the possibility of industrial practice of a process for the production of chlorine by the oxidation of hydrogen chloride has been enhanced further. However, some unsolved problems still remain regarding the maintenance of its catalytic activity.

The present inventors have carried out a variety of investigation with a view toward providing a solution to the above problems. In the course of the investigation, a phenomenon was observed that the catalytic activity decreased gradually in a long-hour reaction even when a chromium oxide catalyst was employed. It has then been found that this phenomenon is attributable to the poisoning of the catalyst by iron. Namely, it has been found that the chromium oxide catalyst is prone to iron poisoning, is poisoned even by iron contained in a small amount in the reactor materials to which the catalyst is brought into contact, and is hence difficult to maintain its high activity for a long period of time. It has also been found that the activity reduction of the catalyst takes place in a long period of time even when a metallic material containing iron only in a very small amount, for example, a high nickel alloy steel is used.

SUMMARY OF THE INVENTION

An object of this invention is to provide an industrially-advantageous process for producing chlorine by oxidizing hydrogen chloride in the presence of chromium oxide as a catalyst while maintaining the catalyst highly active over a long period of time.

Another object of this invention is to provide a reactor which can maintain a chromium oxide catalyst highly active so as to permit advantageous utilization of the catalyst in the industry.

In one aspect of this invention, there is thus provided a process for producing chlorine by reacting hydrogen chloride and oxygen in the presence of a chromium oxide catalyst, where in the reaction is conducted in a reactor whose catalyst-contacting part is lined with one of lining materials represented by the following general formula (I):

$$M_a X_b \qquad (I)$$

wherein M means boron, aluminum, silicon, titanium, zirconium or chromium, X denotes oxygen, nitrogen or carbon, a is an integer of 1–2 and b stands for an integer of 1–3 or with a mixture of at least two of the lining materials.

In another aspect of this invention, there is also provided a reactor suitable for use in the production of chlorine by reacting hydrogen chloride and oxygen in the presence of a chromium oxide catalyst, wherein the reactor is lined at a catalyst-contacting part thereof with one of lining materials represented by the following general formula (I):

$$M_a X_b \qquad (I)$$

wherein M means boron, aluminum, silicon, titanium, zirconium or chromium, X denotes oxygen, nitrogen or carbon, a is an integer of 1–2 and b stands for an integer of 1–3 or with a mixture of at least two of the lining materials.

DETAILED DESCRIPTION OF THE INVENTION

Figure 1:
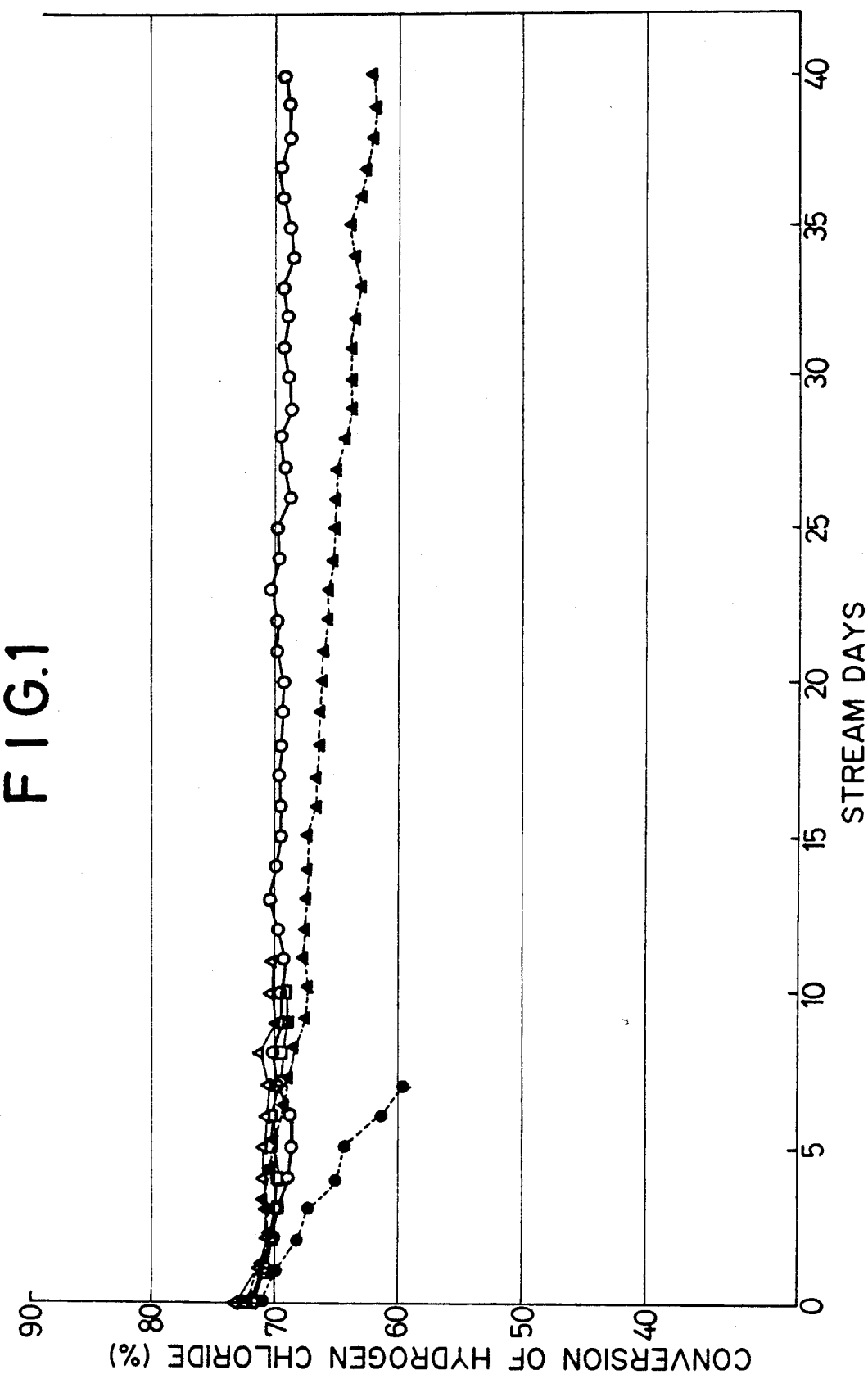
FIG. 1 diagrammatically shows changes of the conversion of hydrogen chloride to chlorine along the passage of days, namely, the conversion of hydrogen chloride as a function of continuous stream days when hydrogen chloride was oxidized into chlorine in the presence of a chromium oxide catalyst by separately using various fluidized-bed reactor materials employed in Examples and Comparative Examples to be described subsequently. In the figure, the marks have the following meaning: ○: Example 1, □: Example 2, △: Example 3, ●: Comparative Example 1, and ▲: Comparative Example 2.

Metals, glass, resins, ceramics and the like are generally used as reactor materials in the industry.

The present inventors conducted a research on various reactor materials which seemed to be usable in the production of chlorine in the presence of a chromium oxide catalyst.

Among these various materials, resin materials were found unusable because the reaction temperature ranges generally from 300° C. to 500° C., preferably, from 350° C. to 450° C. On the other hand, metallic materials such as stainless steels, e.g., SUS304 and SUS316 and high nickel alloy steels, e.g., "Hastelloy B", "Hastelloy C" and "Inconel" exhibited sufficient corrosion resistance. Materials containing iron even in a very small amount were however found to pose a problem, because a chromium oxide catalyst is susceptible to iron poisoning. These findings led to completion of an industrial production process which features the use of a metallic material substantially free of iron, for example, pure nickle as a reactor material.

It was however revealed that when the reaction was continued as an industrial production process for a long period of time even in a reactor of such a material, the metal component is caused to deposit in pores of the catalyst thereby to reduce the activity of the catalyst little by little.

Based on these findings, a further investigation was conducted in various ways on the production of chlorine by the oxidation of hydrogen chloride while using non-metallic materials such as glass and ceramics. As a result, it was found that these materials did not have any deleterious effects to the catalyst and were excellent in both heat resistance and corrosion resistance. However, it was also uncovered that these materials did not have sufficient strength to make up a large reactor singly, thereby making their industrial application difficult. Glass lining materials, which were employed commonly, were also found to involve such problems that they are weak against heat shocks and care must be taken upon their application. The present invention has been completed on the basis of these findings.

Namely, the present invention features to line with a non-metallic ceramic material a catalyst-contacting part in a reactor.

The material for lining the catalyst-contacting part in the reactor suitable for use in the practice of the process of this invention is one of materials represented by the following general formula (I):

$$M_a X_b \tag{I}$$

wherein M means boron, aluminum, silicon, titanium, zirconium or chromium, X denotes oxygen, nitrogen or carbon, a is an integer of 1-2 and b stands for an integer of 1-3 or with a mixture of at least two of the materials.

As specific examples of the lining material, may be mentioned ceramic materials, for example, oxides such as alumina, silica, titania and zirconia, carbides such as silicon carbide, titanium carbide and zirconium carbide, and nitrides such as boron nitride, silicon nitride and titanium nitride. Among these materials, oxides are particularly preferred.

On the other hand, as the base material of a reactor, to be lined with such a lining material, iron or a usual economical heat-resistant metal may be used as mentioned above. It is however preferred to use a stainless alloy or nickel alloy in view of the potential danger that the base material could be corroded if the lining of the non-metallic material should fall off. Use of a nickel alloy having an iron content smaller than 1% is preferable, especially, where the adverse influence of iron to the catalyst is expected.

As the manner of lining the metallic base metal with the material of the general formula (I), it is preferable to form a film of the lining material on the surface of the base material. Besides, the material of the general formula may be bonded in the form of tiles or the like or may be inserted in the form of a sleeve within a metal-made vessel.

The film may be formed by any suitable method, for example, by firing a coating of an organic precursor for a ceramic material into a ceramic film, by thermally spraying powder by means of a plasma or gas flame, or by a vacuum deposition technique such as physical vacuum deposition or chemical vacuum deposition. Although no particular limitation is imposed on the thickness of a film to be formed by one of such methods, a thickness of about 50-200 μm is sufficient practically.

Incidentally, the term "catalyst-contacting part in a reactor" as used herein should be interpreted in such a way that in a fluidized bed reactor by way of example, it embraces not only portions to be brought into contact with a feed gas to the reactor but also portions to be brought into contact with a reaction product gas, to say nothing of portions to be brought into contact with a catalyst in a fluidized state.

The catalyst useful in the reaction of this invention is composed primarily of chromium oxide. For example, it may be a catalyst obtained by molding or granulating as a principal component chromium oxide formed by calcining chromium oxide which has in advance been obtained by precipitating a chromium(III) salt with a basic compound, preferably, together with silicon oxide as a binder; or a catalyst prepared by immersing a silicon oxide carrier, whose pore volume is 0.3-1.5 cc/g preferably, in an aqueous solution of a chromium salt or chromic anhydride and then calcining the thus-immersed carrier to bear 20-80 wt. % of chromia ($Cr_2O_3$).

When the reactor according to this invention is used, the reaction temperature varies depending on the degree of activity of a chromium oxide catalyst employed. However, the reaction may be carried out generally within a range of 300°-500° C., preferably, within a range of 350°-450° C. Beyond 500° C., the activity of the catalyst is reduced and moreover, the corrosion by the product gas becomes significant. On the other hand, any reaction temperatures lower than 300° C. result in a small conversion and are hence not preferred.

The molar ratio of hydrogen chloride and oxygen to be introduced into the reactor may often be within a range of 1/0.25-1/10 as an $HCl/O_2$ ratio.

The suitable linear velocity of the reaction gas may be 10-50 cm/sec.

The concurrent inclusion of inert gases such as nitrogen and carbon dioxide in hydrogen chloride or oxygen to be employed as a raw material does not give any problem to the material of the reactor. The feed gas may also contain other gaseous components, so long as the chromium oxide catalyst can exhibit its ability fully. No problem or inconvenience arises whether the structure of the reactor is of the solid bed type or the fluidized bed type.

The present invention therefore provides a process and reactor extremely useful for the industrial production of chlorine by oxidizing hydrogen chloride in the presence of a chromium oxide catalyst, which allows to carry out the reaction industrially without need for special attention to the corrosion resistance of the reactor while maintaining the activity of the catalyst high for a long period of time.

The present invention will hereinafter be described by the following Examples.

EXAMPLE 1

Figure 2:
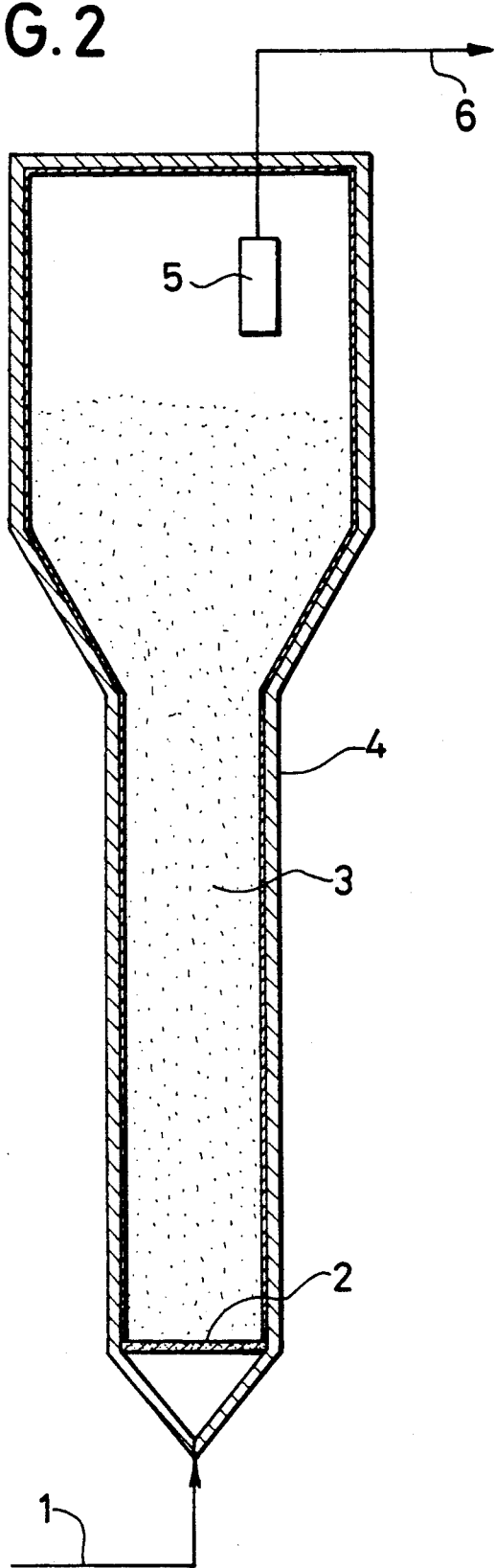
FIG. 2 is a schematic illustration of a fluidized-bed reactor used as one example of the reactor according to this invention in the subsequent Examples, in which there are depicted a feed gas inlet line 1, a sintered alumina-base ceramic plate 2, a fluidized catalyst layer 3, a reactor 4 formed of a nickel pipe, a bag filter 5, and a reaction product gas outlet line 6.

Chromium oxide nonahydrate (3.0 kg) was dissolved in 30 l of deionized water. While stirring the resultant solution thoroughly, 2.9 kg of 28% aqueous ammonia was added dropwise over 30 minutes. Deionized water was added to the resultant slurry of a precipitate to dilute it to 200 l. After allowing the thus-diluted slurry to stand overnight, decantation was repeated to wash the precipitate. The slurry was added with colloidal silica in an amount equivalent to 10% of a total calcined weight, followed by drying in a spray drier to obtain powder. The powder was calcined at 600° C. for 3 hours in air, thereby obtaining a catalyst whose average particle size was 50–60 $\mu$m. The inner wall of a nickel pipe having an inner diameter of 2 inches was sandblasted and then coated with "Tylano Coat" (trade name for a polysiloxane-base coating formulation; product of Ube Industries, Ltd.) to a thickness of 300 $\mu$m. The pipe was thereafter fired at 450° C. to obtain a reactor whose inner wall was lined with a silicon oxide base ceramic material. The reactor is illustrated in FIG. 2. The reactor was packed with 377 g of the catalyst prepared above and was then heated externally to 370° C. by a fluidized sand bath. Hydrogen chloride gas and oxygen gas were then introduced at 3.14 Nl/min and 1.57 Nl/min respectively into the catalyst layer, whereby a reaction was conducted while maintaining the catalyst in a fluidized state. The temperature of the catalyst layer arose to 400° C. owing to the generation of heat.

The discharge gas of the reactor was collected by a trap which consisted of an absorption bulb of an aqueous solution of potassium iodide and an absorption bulb of an aqueous solution of caustic soda connected in series. The aqueous solutions were titrated respectively with an aqueous solution of sodium thiosulfate and hydrochloric acid to quantitatively analyze unreacted hydrogen chloride and chlorine formed.

Changes of the conversion of hydrogen chloride along the passage of days are shown in FIG. 1. The conversion was found to be as high as 68–69% even 40 days later.

EXAMPLE 2

Fine silica gel having a particle size range of 80–250 mesh (pore volume: 0.75 cc/g) was immersed in an aqueous solution which contained 20 wt. % of chromic anhydride dissolved therein. After drying the thus-immersed silica gel at 120° C., it was calcined at 350°–400° C. for 2 hours in air.

The above procedure was repeated three times. Finally, the silica gel was calcined at 500° C. for 3 hours to prepare a catalyst.

The catalyst was analyzed to contain 48 wt. % of chromia and 52 wt. % of silica.

In the same manner as in Example 1, a lining of a silicon oxide base ceramic material was applied on the inner wall of a reactor having an inner diameter of 2 inches and made of a stainless steel (SUS304). The reactor was then packed with 377 g of the catalyst obtained above and a reaction was then carried out in the same manner and under the same conditions as in Example 1.

Changes of the conversion of hydrogen chloride along the passage of days are shown in FIG. 1. The conversion on the 10th day was still as high as 69–70%.

EXAMPLE 3

Powder of a nickel-chromium alloy was thermally undersprayed to a thickness of 50 $\mu$m on the inner wall of a reactor having an inner diameter of 4 inches and made of nickel. Alumina powder was thermally sprayed to a thickness of 150 $\mu$m over the undercoat, so that the inner wall of the reactor was lined. The reactor was packed with 3,505 g of a catalyst of the same kind as that prepared in Example 1. Hydrogen chloride gas and oxygen gas were introduced respectively at 29.2 Nl/min and 14.6 Nl/min into the catalyst, followed by a reaction in the same manner as in Example 1.

Changes of the conversion of hydrogen chloride along the passage of days are shown in FIG. 1. The conversion remained as high as 70–72% even on the 11th day.

EXAMPLES 4–6

Following the procedure of Example 1, the inner walls of reactors having an inner diameter of 2 inches and made of a stainless steel (SUS304) were lined respectively with various ceramic materials shown in Table 1. The reactors were packed separately with 377 g of a catalyst prepared in the same manner as in Example 1. A reaction was conducted in each of the reactors in the same manner and under the same conditions as in Example 1.

The initial conversions of hydrogen chloride and those on the 20th day are given in Table 1.

TABLE 1

| Example | Lining material | Conversion (%) Initial | 20th day |
|---|---|---|---|
| 4 | Al$_2$O$_3$ + TiO$_2$ | 71–73 | 70–72 |
| 5 | BN | 71–73 | 69–70 |
| 6 | SiC | 71–73 | 69–70 |

COMPARATIVE EXAMPLE 1

Using a reactor having an inner diameter of 2 inches and made of a stainless steel (SUS304), a reaction was conducted in the same manner as in Example 1. Changes of the conversion of hydrogen chloride along the passage of days are shown in FIG. 1. The conversion dropped to 60% even after the operation of 7 days.

COMPARATIVE EXAMPLE 2

Using a reactor having an inner diameter of 2 inches and made of nickel, a reaction was conducted in the same manner as in Example 1. Changes of the conversion of hydrogen chloride along the passage of days are shown in FIG. 1. The conversion dropped to 62–63% 40 days later.

What is claimed is:

1. A process for producing chlorine, which comprises reacting hydrogen chloride and oxygen in the presence of a chromium oxide catalyst in a reactor having a catalyst-contacting part which is lined with one or more ceramic materials having the formula:

$$M_a X_b$$

wherein M is boron, aluminum, silicon, titanium, zirconium or chromium; X is oxygen, nitrogen or carbon; a is an integer of 1 to 2, and b is an integer of 1 to 3; and wherein the catalyst-contacting part of the reactor has been thermally undersprayed with a nickel-chromium alloy and then thermally sprayed with ceramic powder comprising said one or more ceramic materials on said nickel-chromium alloy layer.

2. The process as claimed in claim 1, wherein the ceramic material is selected from the group consisting of alumina, silica, titania, zirconia, silicon carbide, titanium carbide, chromium carbide, boron nitride, silicon nitride and titanium nitride.

3. The process as claimed in claim 2, wherein the ceramic materials are selected from the group consisting of alumina, silica, titania and zirconia.

4. The process as claimed in claim 1, wherein the chromium oxide catalyst has been obtained by calcining chromium hydroxide formed by precipitating a chromium (III) with a basic compound.

5. The process as claimed in claim 1, wherein the chromium oxide catalyst has been obtained by precipitating a chromium (III) salt with a basic compound and then adding silicon oxide as a binder to a slurry of a precipitate thus formed.

6. The process as claimed in claim 1, wherein the chromium oxide catalyst has been prepared by immersing a silicon oxide carrier having a pore volume of 0.3–1.5 cc/g in an aqueous solution of a chromium salt or chromic anhydride and then calcining the thus-immersed carrier.

7. The process as claimed in claim 1, wherein the reaction is conducted at a temperature in a range of 300°–500° C. and a molar ratio of hydrogen chloride and oxygen in a range of 1/0.25–1/10.

* * * * *